（12) United States Patent
Rasmussen

(10) Patent No.: US 6,221,457 B1
(45) Date of Patent: Apr. 24, 2001

(54) DISPLAY SYSTEM FOR CURVED SURFACES

(75) Inventor: Peter Rasmussen, Berkeley, CA (US)

(73) Assignee: R & R Partners, Berkeley, CA (US)

( * ) Notice: Subject to any disclaimer, the term of this patent is extended or adjusted under 35 U.S.C. 154(b) by 0 days.

(21) Appl. No.: 08/443,058

(22) Filed: May 17, 1995

(51) Int. Cl.[7] .................................................. G09B 27/08
(52) U.S. Cl. .................... 428/99; 40/615; 428/11; 428/13; 428/65; 428/137; 428/192; 428/542.2; 428/913.3; 434/131; 434/135; 434/137
(58) Field of Search .................... 428/11, 13, 35, 428/99, 137, 192, 542.2, 913.3, 43, 131; 40/615; 434/131, 135, 137

(56) References Cited

U.S. PATENT DOCUMENTS

| | | | | |
|---|---|---|---|---|
| 2,510,215 | * | 6/1950 | Pityo | 434/131 |
| 3,055,123 | * | 9/1962 | Wigal | 434/137 |
| 3,063,163 | * | 11/1962 | Dukes | 434/131 |
| 3,637,446 | * | 1/1972 | Elliott | 428/11 |
| 3,977,458 | * | 8/1976 | Kuen | 428/11 |
| 4,414,731 | * | 11/1983 | Riemer | 428/11 |
| 4,456,258 | * | 6/1984 | Lodrick | 428/11 |

FOREIGN PATENT DOCUMENTS

782249 * 9/1957 (GB) ..................................... 428/11

* cited by examiner

Primary Examiner—Nasser Ahmad
(74) Attorney, Agent, or Firm—Michael A. Glenn

(57) ABSTRACT

A flexible sheet can be stored or patterned while in a flat configuration, and subsequently readily adapted to overlay a curved surface, for example a hemisphere of a sphere. Radial incisions made to the sheet provide a hub and a plurality of substantially triangular gores that adapt the sheet to conform substantially to the curved surface. A patternable transparent cover, adapted to be removably and/or pivotally secured to the hemisphere, closely overlays the sheet to form a covering assembly. Covering assemblies may be placed over one or both hemispheres of a sphere and fixedly or removably joined together.

13 Claims, 3 Drawing Sheets

DISPLAY SYSTEM FOR CURVED SURFACES

BACKGROUND OF THE INVENTION

1. Technical Field

The invention relates to curved surfaces, such as spheres. More particularly, the invention relates to displaying removable, patternable coverings on such curved surfaces.

2. Description of the Prior Art

The use of globes as educational tools is well known. A globe is an invaluable visual aid for demonstration of three-dimensional concepts, such as in topography, astronomy, and spherical geometry. The Lénárt Sphere (see I. Lénárt, *Alternate Models On The Drawing Ball*, paper presented at the 7th International Congress On Mathematics Education, Montreal, Quebec, Canada, 1992), for example, is a globe specifically designed to demonstrate concepts in non-Euclidean, or spherical, geometry.

While the spherical shape of a globe offers the advantage of three-dimensional representation, it is difficult to mark the surface of a globe accurately. For example, the features on a geographically configured globe must be precisely located. The curved surface, however, is not easily printed upon, either by machine or by hand.

Further, a globe having a particular configuration, such as a meteorological map, is limited to that representation. It is thus not possible to represent changing contours, such as weather systems or national borders.

Rogers, Globe and Measuring Device, U.S. Pat. No. 3,997,980 (Dec. 21, 1976) discloses a geographically configured globe having a curved, three dimensional pivotal overlay. The overlay is pre-patterned with measuring indicia. While simplifying certain measurements, the indicia imprinted on the overlay cannot be modified.

Additionally, it is often desirable to permit students to prepare individual projects using a globe. While the Rogers overlay is removable, it is not designed to provide individual overlays for each user of a globe to prepare an individual project. A three-dimensionally shaped overlay also requires substantial storage space, and is subject to damage or deformation during storage or shipping.

It would therefore be a significant advance in the art to provide a cost-effective, removable globe covering capable of being easily and accurately patterned. It would be particularly useful to provide such a covering requiring minimal storage space and not subject to risk of damage.

SUMMARY OF THE INVENTION

The invention provides a removable, flexible sheet that can be stored or patterned while in a flat position, and that is readily adapted to conform to a hemispherical or spherical object, such as a globe.

In one preferred embodiment of the invention, the sheet is capable of being patterned. Radial incisions made in the sheet produce a covering in the form of a hub or a band and a plurality of substantially triangular polyconic gores that radiate therefrom and that adapt the sheet to conform substantially to a curved surface, such as sphere or hemisphere. A patternable transparent cover, adapted to be removably and pivotally secured to the hemisphere, closely overlays the sheet to form a covering assembly. Covering assemblies may be placed over both hemispheres of a sphere and removably joined by a ring.

DETAILED DESCRIPTION OF THE INVENTION

The invention provides a removable, flexible sheet that can be stored or patterned while in a flat position, and that is readily adapted to conform substantially to a curved surface, for example that of a hemispherical or spherical object, such as a globe, or that of an ellipsoid.

Figure 1:
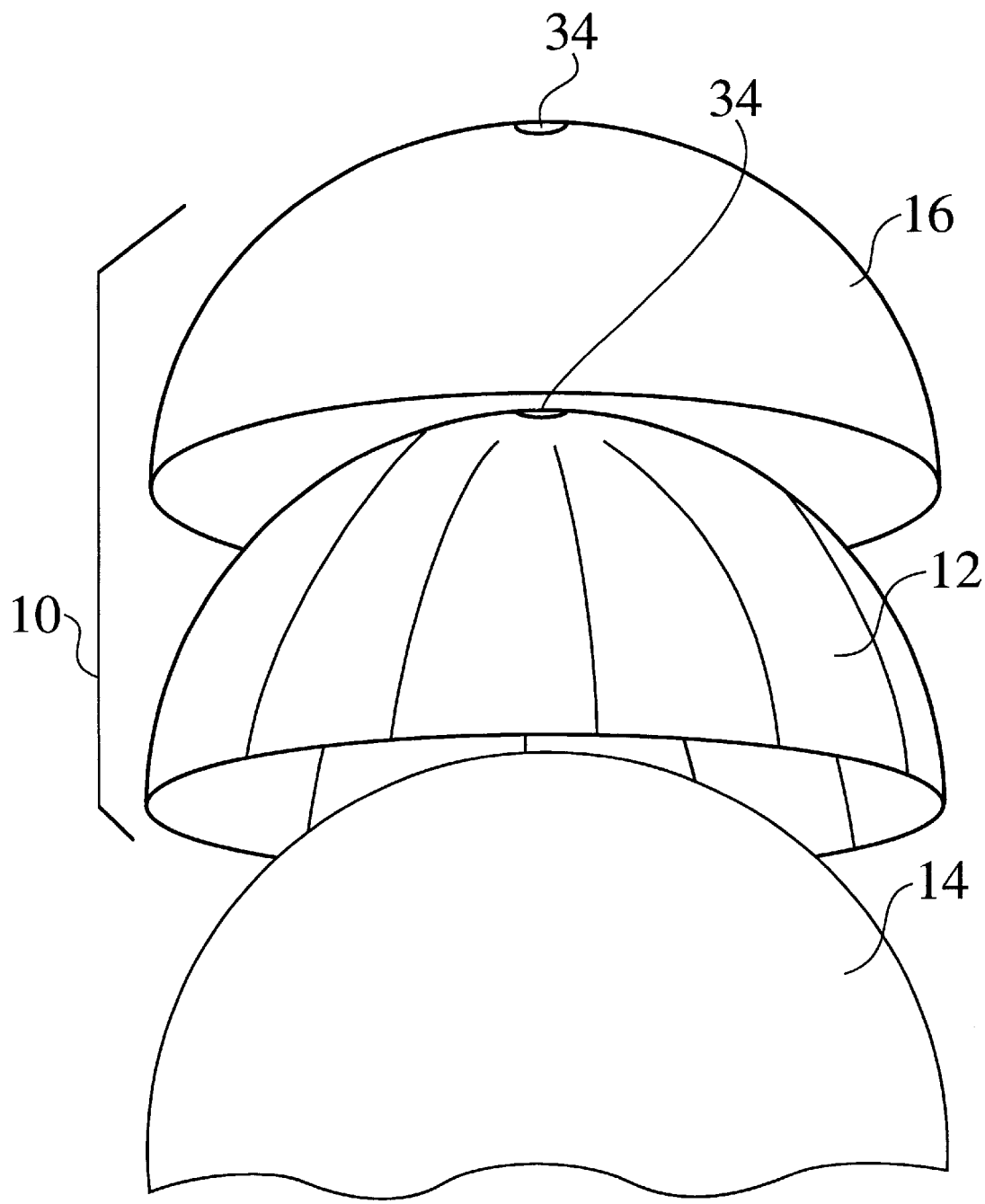
FIG. 1 is an exploded perspective view of a covering assembly for a curved surface according to the invention.

FIG. 1 shows an exploded perspective view of a covering assembly 10. The covering assembly includes a sheet 12 that is placed over a hemisphere 14 to provide a conforming overlay. A transparent cover 16 is subsequently placed over the sheet to complete the covering assembly 10.

The sheet may be conveniently patterned by any desired methods, including printing, writing, and drawing, while it is in its flattened configuration. The use of a patternable sheet permits preparation of multiple individual sheets for use with a single sphere and transparent cover. In an equally preferred embodiment of the invention, the patterning on the sheet is erasable. Thus, additions or corrections may be easily made.

The sheet herein disclosed provides a cost-effective educational tool for many academic subjects, including geography, cartography, astronomy, spherical geometry, biology, meteorology, art, and history. For example, population migrations can be charted, as can changing borders or weather patterns. Individual sheets can be printed to show, for example the topography of the moon, the sun, and the individual planets. The invention is also applicable to demonstrate the principles of cartography. As three-dimensional visualization is a difficult skill to master, the patternable sheet herein disclosed is also particularly useful to illustrate particular concepts of spherical geometry.

The transparent cover protects the sheet, while holding it in substantial conformance with the surface of the hemisphere. In a preferred embodiment of the invention, the transparent cover may be permanently patterned, or it may be temporarily patterned, such as with an erasable marker. Thus, additions or corrections may be made to the pattern on the sheet without actually changing the sheet itself. The same sheet may therefore be used in conjunction with a plurality of transparent covers. In an alternative embodiment, the transparent cover is pre-patterned, for example, with a grid. In yet another embodiment of the invention, the transparent cover is not required because the sheet is made of a flexible plastic material that clings to the surface of the hemisphere as a result of electrostatic forces, or through the use of tacky, but readily removable, adhesives, such as the adhesive used to make 3M PostIts®.

Figure 2:
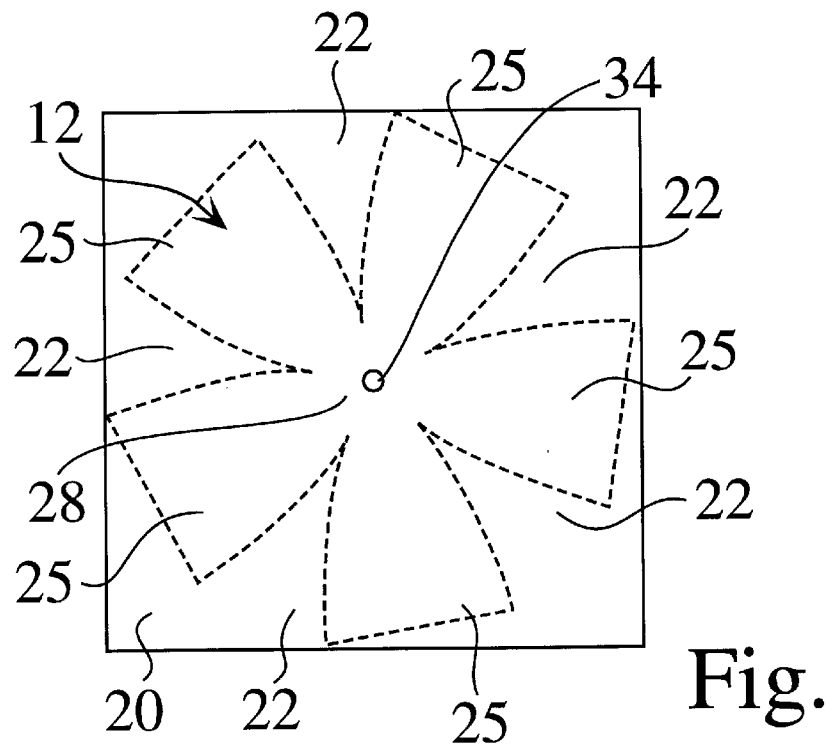
FIG. 2 is a top view of a sheet in a planar sheet configuration according to the invention.

FIG. 2 is a top view of the of the sheet 12 in a planar or flattened configuration. A flattened sheet requires minimal storage space, and is less subject to damage or deformation. It is apparent that accurate writing or printing is better accomplished when the sheet is in a flattened position. Additionally, a flattened sheet is readily used in a printer or photocopy machine. Larger quantities of sheets can therefore be easily produced with reduced printing costs. This is particularly helpful in an educational environment, where cost is an important factor.

To use the sheet as an overlay for a sphere, the sheet must be converted from the flattened configuration to a curved shape, such as a hemispherical or spherical configuration. Thus, the sheet may be provided in an initial rectangular shape 20, where the sheet has a patterned or scored portion 22 that may be removed to define a construct that comprises a hub 28 and a plurality of substantially triangular polar polyconic gores 25 that project therefrom.

Figure 3:
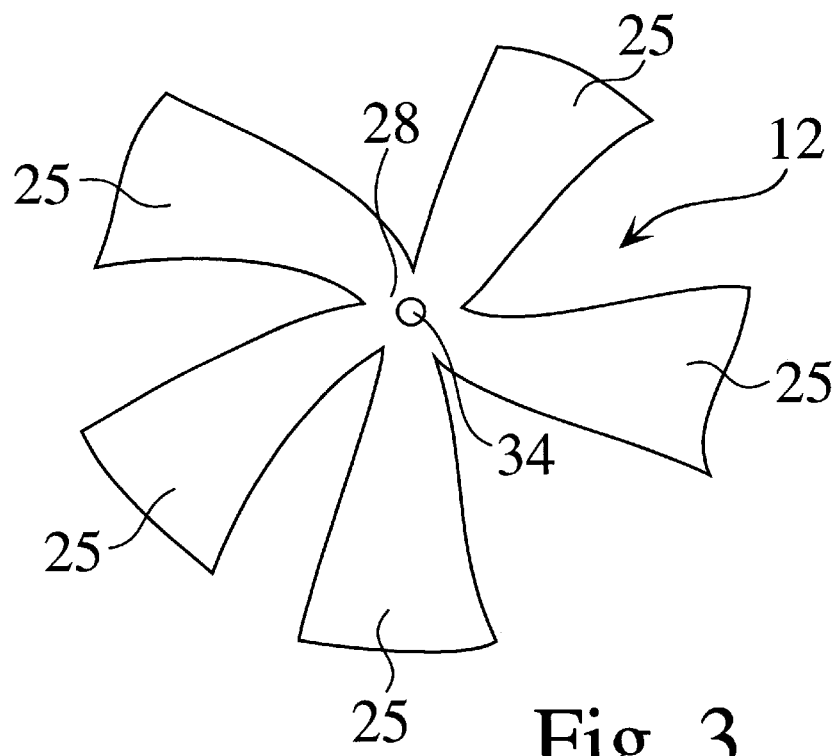
FIG. 3 is a top view of the sheet according to the invention.

FIG. 3 is a top view of a sheet 12 prior to assuming a substantially hemispherical configuration according to the invention. The sheet may be formed of a flexible, patternable material such as paper or plastic sheeting. Radial incisions are made in the flattened sheet to define the hub and the plurality of gores that permit the sheet to be positioned such that it conforms substantially to a curved surface, such as the shape of a hemisphere. The incisions may be made with a cutting implement such as scissors along printed dashed lines, through the use of a template or die, or the sheet may be prepunched such that a series of perforations are provided. The sheet may be provided in either uncut or precut form.

The actual number of gores provided is a matter of choice. It is important that there be a sufficient number of gores to completely cover a hemisphere without leaving gaps, while assuring that the sheet conforms well to the surface of the hemisphere. The hub should be formed such that the gores are well secured together, while not interfering with the ability of the sheet to conform substantially to surface of the hemisphere.

Figure 4:
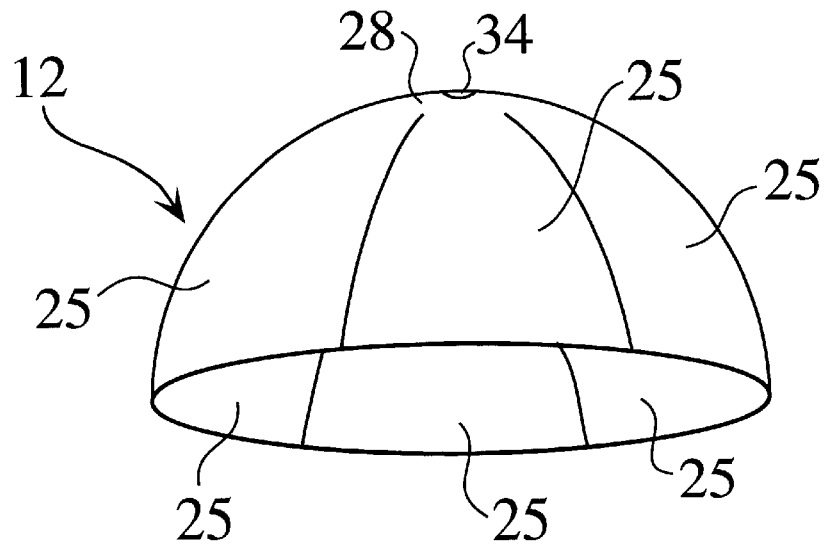
FIG. 4 is a perspective view of the sheet in a hemispherical configuration according to the invention.

A perspective view of the sheet in a hemispherical configuration is shown in FIG. 4. A plurality of substantially triangular polyconic gores that project from a central hub, like the spokes of a bicycle wheel, are preferred because the gores 25 are readily manipulated at their ends when the sheet is placed upon the hemisphere, thus simplifying the task of aligning them to cover the hemisphere completely. The actual number of gores provided is a function of the size of the sphere or hemisphere to be covered and the desired degree of conformity of the sheet to the sphere or hemisphere. Providing more gores allows the covering to more completely conform to the surface of the sphere or hemisphere.

Additionally, other types or shapes of gores may be used in alternative embodiments of the invention. For example, the substantially triangular polyconic gores may project from an equatorial band, such that the tips of these equatorial gores converge at a pole. Alternatively, it is possible to cut out one covering that covers an entire sphere, for example where each gore is provided in the shape of two convex, intersecting arcs, rather than a substantial triangle, and is configured to extend from the hub to an opposite pole of the sphere; or where sets of gores extend outwardly in opposite directions from an equatorial band.

Figure 5:
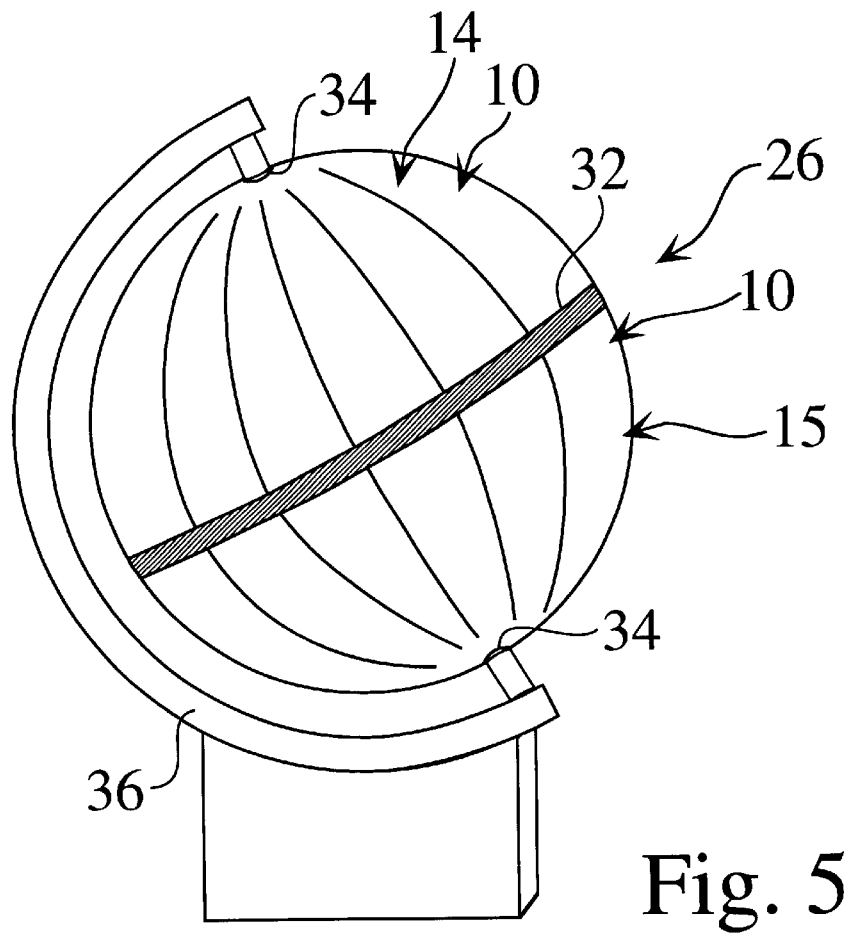
FIG. 5 is an exploded perspective view of a covering assembly on a sphere according to the invention.

FIG. 5 is an exploded perspective view of a sphere 26 according to the invention. In one preferred embodiment of the invention, a covering assembly 10, consisting of a sheet 12 and a transparent cover 16, is placed over the first hemisphere 14 of the sphere. A set of pivots 34 permits the sphere to rotate, for example while retained in an armature and base assembly 36 having an axis of rotation equal to that of the earth, while the covering assembly is retained in position on the first hemisphere. The pivots may be provided in any known manner, for example as apertures or slots formed in the sphere, or they may be members that project from the poles of the sphere.

In another equally preferred embodiment of the invention, the second hemisphere 15 of the sphere may also be covered by a covering assembly. In either case, the sheet and transparent cover may each be formed with an aperture at each pole location to allow air to escape when placing the covering assembly on, and to allow air to enter when removing the covering assembly from, the surface of the hemisphere, to permit insertion of a pivot point therethrough, and also to provide registration of the covering assembly with the hemisphere.

A ring or band 32, for example tape, an elastic band, such as a rubber band, or a flexible strip, or a rigid plastic ring, may be used to join the two covering assemblies and/or hemispheres. The ring may be journaled on an inner surface (not shown) using known techniques to provide, for example, a compressive fit of the covering assemblies and/or hemispheres. The assemblies may be joined permanently or temporarily to form a globe. A hanger (not shown) may be secured to the ring to suspend the globe. The globe may alternatively be supported on a stand (as discussed above) or a toroidal ring. Alternatively, two covering assemblies may be joined together without a spherical support surface therebetween. For example, the sphere may be used to provide a rigid support surface and/or a patterned surface, upon which one places a transparent cover or covering assembly, such that the cover is easily written or drawn upon. After the cover is marked as desired, a pair of covers or covering assemblies may then be placed together to display the marked cover, for example as a piece of artwork or a map, while the sphere is used for additional projects.

Although the invention is described herein with reference to preferred embodiments, one skilled in the art will readily appreciate that other applications may be substituted for those set forth herein without departing from the spirit and scope of the invention. For example:

The sheet may be pre-patterned, such as with a grid to represent longitude and latitude lines, or with maps. The sheet and/or the transparent cover may then be written upon.

Two covering assemblies may be joined together separate from a globe to form a sphere that is used to display the patterned sheet. Students, for example, could thus take their projects home, while leaving the globe behind in the classroom.

The sheet may be shipped and stored in a flattened position that is formed by pleating. Expanding the pleats allows the sheet to conform to the surface of the hemisphere. The transparent cover holds the sheet to the globe and thereby straightens the pleats.

Portions of the sheet may be cut or punched out, in addition to those areas that are removed to form the gores, prior to placing the sheet over the globe to expose underlying features of the globe. For example, holes may be formed in the gores to provide points of registration with the surface of the hemisphere.

A lighted globe may be used to highlight patterns on the sheet or transparent cover, or may be used to project patterns cut out of the sheet from globe onto a screen or other exterior surface.

Accordingly, the invention should only be limited by the claims included below.

What is claimed is:

1. A covering for a sphere or hemisphere, comprising:
   a flexible sheet having a display surface, said sheet being partially cut to define a hub or a band and a plurality of polyconic gores that extend therefrom, wherein said sheet is readily removable from said sphere or hemisphere such that it is alternately configurable between both a substantially hemispherical shape, when said sheet is placed upon said sphere or hemisphere to conform substantially to the surface of said sphere or hemisphere, and a substantially planar shape when said sheet is not placed upon said sphere or hemisphere; and a removable hemispherical cover that is at least partially transparent and that is shaped to closely overlay said sheet when said sheet is positioned upon said sphere or hemisphere, wherein said sheet and said cover, when positioned upon said sphere or hemisphere, comprise a covering assembly for said sphere or hemisphere.

2. The covering of claim 1, wherein said cover is adapted to be removably and/or pivotally secured to said hemisphere.

3. The covering of claim 1, wherein said gores are manipulatable to align said sheet to conform to said curved surface.

4. The covering of claim 1, wherein said sheet is patternable.

5. The covering of claim 1, further comprising:

two covering assemblies, one of said assemblies being placed in contact with the surface of a first hemisphere of said sphere and the other of said assemblies being placed in contact with the surface of a second hemisphere of said sphere.

6. The covering of claim 5, further comprising:

means for fixedly or removably joining two covers or two covering assemblies.

7. The covering of claim 6, wherein said means for joining is any of a ring, a rigid band, an elastic band, a strip, or a journaled surface.

8. A covering for a sphere or hemisphere, comprising:

at least one flexible sheet having a display surface, said sheet being partially cut to define a hub or a band and a plurality of polyconic gores that extend therefrom, wherein said sheet is readily removable from said sphere or hemisphere such that it is alternately configurable between both a planar shape when said sheet is not placed upon said sphere or hemisphere, and a spherical or hemispherical shape when said sheet is placed upon said sphere or hemisphere, wherein said sheet is adapted to conform substantially to the surface of said sphere or hemisphere; and at least one removable cover that is at least partially transparent and that is shaped to overlay closely said sheet, wherein said cover and said sheet form at least one covering assembly.

9. The covering of claim 8, wherein the hub of said sheet may define a polar aperture formed therethrough; and wherein said cover may define a polar aperture formed therethrough.

10. The covering of claim 8, further comprising:

a ring adapted to fixed y or removably join a first covering assembly to a second covering assembly, wherein said ring is any of a rigid band, an elastic band, a strip, or a journaled surface.

11. The covering of claim 8, further comprising:

a sphere having a first and a second hemisphere, each hemisphere having a pole; and a pivot point at each pole.

12. The covering of 8, wherein said sheet defines at least one aperture adapted to register said sheet to said surface of said sphere or hemisphere, to register said cover to said sheet, and/or to allow air to escape or enter when said sheet is placed on, or removed from, the surface of said sphere or hemisphere.

13. The covering of 8, wherein said cover defines at least one aperture adapted to register said cover to said sheet, and/or to allow air to escape or enter when said cover is placed on, or removed from, the surface of said sphere or hemisphere.

* * * * *